United States Patent
Zalio

(10) Patent No.: US 8,599,977 B2
(45) Date of Patent: Dec. 3, 2013

(54) DEVICE AND METHOD FOR ESTIMATING DOPPLER SPREAD IN A MOBILE COMMUNICATIONS TERMINAL

(75) Inventor: Filip Zalio, Victoria (AU)

(73) Assignee: NEC Corporation, Tokyo (JP)

( * ) Notice: Subject to any disclaimer, the term of this patent is extended or adjusted under 35 U.S.C. 154(b) by 40 days.

(21) Appl. No.: 13/124,938

(22) PCT Filed: Sep. 11, 2009

(86) PCT No.: PCT/JP2009/004545
§ 371 (c)(1),
(2), (4) Date: Apr. 19, 2011

(87) PCT Pub. No.: WO2010/047037
PCT Pub. Date: Apr. 29, 2010

(65) Prior Publication Data
US 2011/0200073 A1 Aug. 18, 2011

(30) Foreign Application Priority Data
Oct. 24, 2008 (AU) ................. 2008905519

(51) Int. Cl.
*H03D 1/04* (2006.01)
(52) U.S. Cl.
USPC .......................................................... 375/346
(58) Field of Classification Search
USPC ................ 375/316, 340, 346; 367/87, 89, 90; 370/203, 208, 210
See application file for complete search history.

(56) References Cited

U.S. PATENT DOCUMENTS

| 6,424,644 B1 | 7/2002 | Siala et al. | |
| 6,674,740 B1 | 1/2004 | Siala | |
| 7,280,604 B2* | 10/2007 | Giannakis et al. | 375/260 |
| 7,436,757 B1* | 10/2008 | Wilson et al. | 370/203 |
| 2002/0150037 A1* | 10/2002 | Bao et al. | 370/208 |
| 2003/0142764 A1* | 7/2003 | Keevill et al. | 375/341 |
| 2006/0205406 A1* | 9/2006 | Pekonen et al. | 455/436 |
| 2006/0239180 A1* | 10/2006 | Khan et al. | 370/208 |
| 2007/0211786 A1* | 9/2007 | Shattil | 375/141 |
| 2007/0287385 A1* | 12/2007 | Stephenne | 455/67.11 |

FOREIGN PATENT DOCUMENTS

| CN | 101129083 A | 2/2008 |
| JP | 2002-523962 A | 7/2002 |
| JP | 2002-523967 A | 7/2002 |
| WO | 2006/064310 A1 | 6/2006 |
| WO | 2006/097803 A1 | 9/2006 |

OTHER PUBLICATIONS

Chinese Office Action dated May 6, 2013 in corresponding Chinese Application No. 200980142492.5.

\* cited by examiner

*Primary Examiner* — Sam K Ahn
*Assistant Examiner* — Vineeta Panwalkar
(74) *Attorney, Agent, or Firm* — Sughrue Mion, PLLC

(57) ABSTRACT

The invention is suitable for use in an OFDM system, such as the 3GPP-LTE mobile phone system. A method of estimating Doppler spread in a mobile communications device includes: (a) selecting a channel estimate from each of a sequence of time slots at each of a series of selected sub-carrier frequencies; (b) performing a Digital Fourier Transform (DFT) on the selected channel estimates at each selected sub-carrier frequency to thereby compute DFT components at different frequency bins; (c) summing the DFT components at all selected sub-carrier frequencies for each different frequency bin; (d) detecting the frequency bin at which the summed DFT components first falls below a predetermined threshold; and (e) converting the detected frequency bin into a Doppler spread estimate.

10 Claims, 6 Drawing Sheets

CHANNEL ESTIMATE SELECTION, BUFFERING AND DFT

DEVICE AND METHOD FOR ESTIMATING DOPPLER SPREAD IN A MOBILE COMMUNICATIONS TERMINAL

CROSS REFERENCE TO RELATED APPLICATION

This application is a National Stage of International Application No. PCT/JP2009/004545 filed Sep. 11, 2009, claiming priority based on Australian Patent Application No. 2008-905519, filed Oct. 24, 2008, the contents of all of which are incorporated herein by reference in their entirety.

TECHNICAL FIELD

The present invention relates generally to communication systems involving one or more mobile communications devices, and in particular to the estimation of Doppler spread at such mobile communications devices.

BACKGROUND ART

When a mobile communications device moves at a non-zero speed, such as in a vehicle or even when being used by a pedestrian, the downlink radio signal from the base station to the mobile communication device undergoes a process called fading. Fading appears as a relatively slow pseudo random variation of phase and amplitude of the received signal. The speed of the variation, measured as "Doppler spread", is related to the movement speed of the mobile communication device.

Doppler spread is a different phenomenon to Doppler shift. Doppler shift is an apparent change in frequency at the mobile communication device, due to radial speed between the mobile communication device and the base station. Doppler shift is normally cancelled by the communication device's automatic frequency control loop.

A mobile communication system can be designed in such a way that an active mobile communication device estimates the Doppler spread at its antenna. The estimation is then reported to the base station, which uses this information to improve the allocation of radio resources to each individual mobile communication device. For example, the base station can opt to allocate short transmission bursts with high bandwidth and with low duty cycle to a faster moving mobile communication device, and long bursts with lower total bandwidth to slower moving mobile communication device. In both cases, the average data rate for each mobile communication device would be the same (see for example Patent Citation 1 and Patent Citation 2). However, if the mobile communication device also reports instantaneous quality of the downlink signal—such as Code Quality Indicator (CQI) in the 3GPP WCDMA or 3GPP LTE OFDM system—and the base station transmits to the high speed mobile communication device at times of its peak downlink signal (CQI) quality, the overall average reception quality can be improved.

CITATION LIST

Patent Literature

PTL 1: JP-T-2002-523967
PTL 2: JP-T-2002-523962

DISCLOSURE OF THE INVENTION

Problems to be Solved by the Invention

However, existing techniques for estimating Doppler spread at a mobile communication device require a positioning device (such as a GPS receiver), access to an absolute time or frequency reference, very precise calibration of the mobile communication device's own frequency reference, or assistance from the base station.

Accordingly, there exists a need to provide an estimate of Doppler spread at a mobile communication device in a more efficient and less cumbersome manner than is currently possible. Moreover, it would be desirable to provide a method and device for estimating Doppler spread in a mobile communication device that ameliorates or overcomes one or more disadvantages of known Doppler spread estimating techniques.

Means for Solving the Problems

According to a first aspect of the invention, there is provided a method of estimating Doppler spread in a mobile communications device, the method including:
(a) selecting a channel estimate from each of a sequence of time slots at each of a series of selected sub-carrier frequencies;
(b) performing a Digital Fourier Transform (DFT) on the selected channel estimates at each selected sub-carrier frequency to thereby compute DFT components at different frequency bins;
(c) summing the DFT components at all selected sub-carrier frequencies for each different frequency bin;
(d) detecting the frequency bin at which the summed DFT components first falls below a predetermined threshold; and
(e) converting the detected frequency bin into a Doppler spread estimate.

A method including these steps uses channel estimates, which the mobile communication device has to calculate in any case in order to receive the downlink correctly. Information about the fading process is derived from using these channel estimates, in order that an estimate of the Doppler spread at the mobile communication device is derived.

Conveniently, step (b) includes implementing a Goertzel algorithm to the selected channel estimate at each selected sub-carrier frequency. Rather than computing a Fast Fourier transform algorithm evenly across the bandwidth of an incoming signal, the Goertzel algorithm looks at specific predetermined frequencies and thus minimizes the computational requirements of the method of estimating Doppler spread.

The channel estimates are preferably calculated from received pilot symbols at the first symbol of each time slot. Moreover, the selected sub-carrier frequencies are preferably evenly spaced across a transmission bandwidth.

In a practical exemplary embodiment of the invention, the DFT components computed from the selected channel estimates at each selected sub-carrier frequency in step (b) may be stored separately in a buffer prior to being summed at step (c).

In order to further minimize the computational requirements involved in the Doppler spread estimating, step (b) may involve computing DFT components only of the first N_dft lowest frequency bins, where N_dft is a predetermined integer.

Another aspect of the invention provides a method of estimating the speed of a mobile communication device including: estimating the Doppler spread in the mobile communication device by carrying out the above-described method, and converting the Doppler spread estimate into an estimated speed of the mobile communication device. Such a computation can be used to improve the precision of location services associated with the mobile communication device, for example, to fill in location data to a navigation system in an "urban canyon" environment where GPS signals might not always be available.

Another aspect of the invention provides a Doppler spread estimator for estimating Doppler spread in a mobile communication device, the estimator including one or more computational blocks for carrying out the above-described Doppler spread estimating method.

Another aspect of the invention provides a speed estimator for estimating the speed of a mobile communication device, the estimator including one or more computational blocks for carrying out the above-described mobile communication device speed estimating method.

Yet another aspect of the invention provides a mobile communication device including a Doppler spread estimator as described hereabove.

A still further aspect of the invention provides a mobile communication device including a speed estimator as described hereabove.

Advantageous Effects of Invention

The invention is suitable for use in an OFDM system, such as the 3GPP-LTE mobile phone system, and it will be convenient to describe the invention in relation to that exemplary application.

DESCRIPTION OF EMBODIMENTS

The invention will now be described in further detail by reference to the accompanying drawings. It is to be understood that the particularity of the drawings does not supersede the generality of the preceding description of the invention.

Referring firstly to FIG. 1, there is depicted generally a mobile communication system 10 including a base station 12 and mobile communication device 14. A signal is transmitted from the base station 12 to the mobile communication device 14 over a radio channel 16 subject to fading. After reception of the signal by the radio receiver block 18, the signal is digitized by the analog digital converter 20. Detection of data within data frames is made possible by the timing alignment block 22.

A Fast Fourier transform (FFT) is periodically computed by an FFT block 24 in the mobile communication device 14 from the received signal, over the entire bandwidth allocated to the system 10. The time period over which the FFT is repeatedly calculated is called a symbol in 3GPP LTE terminology. Several symbols (typically six or seven) form a slot. Each slot is transmitted over a precisely defined time, which is set to 0.5 milliseconds by the 3GPP LTE standard. Each frequency bin at the output of FFT, at one symbol, is called a resource element. Each resource element is defined as a position in time (namely at a particular symbol position within a particular slot) and at a particular frequency. The distance frequencies at the output of the FFT are called subcarriers, and are equally spaced. The 3GPP LTE system is defined with subcarrier spacings of 15 kHz or 7.5 kHz.

Each resource element can carry information transmitted from the base station, in the form of an information symbol (which is not the same as the OFDM symbol specified above) and modulated in BPSK, QPSK, 16 QAM or 64 QAM in the 3GPP LTE system. Some symbols, in predefined resource element positions carry a fixed QPSK-modulated sequence, which are called reference signals or "pilots". Since these "pilots" don't carry any information themselves, and are known to the mobile communication device, they are used to estimate the instantaneous phase and amplitude of the fading process. The value of fading on positions other than the pilots are determined by the channel estimation block 26. Typically, this block carries out time and frequency domain-based interpolation.

The output of the channel estimation function is therefore a replica or a two-dimensional array which represents the state of the radio frequency channel fading, at consecutive time samples and at each subcarrier (i.e. for each resource element). The structure of the output of the channel estimation function performed by the channel estimation block 26 is depicted in FIG. 2. As part of the reception, the mobile communication device 14 uses the channel estimates to compensate for the fading in an equalization block 28, before proceeding with demodulating channel symbols in a demodulation block 30.

The present invention makes use of the channel estimates computed in the channel estimation block 26 to estimate the Doppler spread of the mobile communications device 14. FIG. 3 depicts various processing blocks that are carried out by the Doppler spread estimation block 32 forming part of the mobile communication device 14.

Initially, a channel estimate selector block 50 selects a subset of channel estimates. The selected subset contains, in the exemplary embodiment depicted in FIG. 2, a single channel estimate from each slot in the timing domain. In other exemplary embodiments of the invention, more than one channel estimate per slot may be used. Preferably, the channel estimates are of pilot symbols at the first symbol of each time slot, since this is where the channel estimates are most precise.

In the frequency domain, the channel estimate selector block 50 chooses N_sc sub-carriers, which are evenly spaced across a transmission bandwidth. Accordingly, channel estimates are selected from each of a sequence of time slots at each of a series of selected subcarrier frequencies.

Each selected channel estimate is separately stored in a buffer 52. Exemplary buffers 70, 72 and 74 are depicted in FIG. 4 respectively for storing channel estimates from a sequence of time slots at three exemplary subcarrier frequencies.

The sequence of time slots from which channel estimates are selected includes N_slots consecutive time slots. A typical value that works well with 3GPP LTE communication systems is N_slots=200. In other exemplary embodiments of the invention however, a different number of time slots may be included in the sequence. Similarly, the channel estimate selector chooses N_sc subcarriers evenly spaced across a desired transmission bandwidth. A typical value which works well with 3GPP LTE systems is N_sc=8. Of course, in other exemplary embodiments of the invention, a different number of subcarriers may be used.

Once all channel estimates from the N_slots time slots at each of the N_sc selected subcarrier frequencies, a Discrete Fourier Transform (DFT) is performed by DFT block 54. The DFT computation is performed separately for the channel estimates collected for each selected subcarrier, resulting in N_sc separate DFT output sample sets. Exemplary DFT computation blocks 75, 78 and 80, respectively connected to the output of the buffers 70, 72 and 74 are depicted in FIG. 4.

Although the number of channel estimates provided to the buffers 70 to 74 as inputs is N_slots, it is not necessary for the value of N_slots to be a power of two. Furthermore, it is not necessary for all possible N_slots values to be used in the DFT computations performed by the computation blocks 76 to 80. DFT components need only be computed for the first N_DFT lowest frequency bins. A value of N_DFT=40 has been determined by the inventor to be sufficient for a 3GPP LTE communications system.

Due to these simplifying requirements, it is not necessary to use a Fast Fourier Transform (FFT) algorithm in the mobile communications device 14. Instead, a Goertzel algorithm or other less computationally demanding transform can be used. The Goertzel algorithm is a digital signal processing technique used for identifying frequency components of a signal. While the general Fast Fourier Transform (FFT) algorithm computes evenly across the bandwidth of the incoming signal, the Goertzel algorithm looks at a specific, predetermined frequency.

In the context of the present invention, the Goertzel algorithm is carried out as follows:

At system startup, a set of coefficients is precalculated as follows:
for k=0 ... $N_{dft}$−1:

$$DFT\_COEFF_k=2*cos(2*K*PI/N_{slots})$$

Alternately, these can be stored in a ROM or other memory device (not shown). Next, at the end of an N_slot accumulation period, variables Q1 and Q2 are set:
for c=0 ... $N_{dft}$−1:

$$Q1_{c,k}=0$$

$$Q2_{c,k}=0$$

In this example, Q1 and Q2 are two-dimensional buffers (not shown).

Next, DFT coefficients are calculated for each subcarrier separately, as per the Goertzel algorithm:
for slot in 0 ... N_slot−1:
   for c=0 ... $N_{sc}$−1:
      for k=0 ... $N_{dft}$−1:

$$Q0=DFT\_COEFF_k*Q1_{c,k}-Q2_{c,k}+Re\{ce\_sample_{slot,c}\}$$

$$Q2_{c,k}=Q1_{c,k}$$
$$Q1_{c,k}=Q0$$

In the above, Re{ } refers to taking only real part of the channel estimation. Next, set
for k=0 ... $N_{dft}$−1:
$DFT_k=0$ Next, calculate the final power as per the Goertzel algorithm;
for c=0 ... $N_{sc}$−1:
   for k=0 ... $N_{dft}$−1:

$$Mag=[Q1_{c,k}]2=[Q2_{c,k}]2-Q1_{c,k}*Q2_{c,k}*DFT\_COEFF_k$$

$$DFT_k=DFT_k+Mag$$

The above equation is a summation function which is performed by a DFT summation block 56. This summation function is also depicted in FIG. 5. According to this summation function, the DFT components at all selected subcarrier frequencies for each different frequency bin are summed. The result of the summation DFT [k] may be stored in a buffer an example of typical comments of the buffer DFT[k] is shown in FIG. 6. Most typical radio channels scenarios that follow the Rayleigh fading processing, will show a distinct edge in the summed values. That edge corresponds to the maximum Doppler frequency of the fading process, or the Doppler spread. The position of the edge, namely the corresponding value of the frequency bin k, represents the Doppler spread frequency. Accordingly, in order to estimate the Doppler spread, the frequency bin at which the summed DFT components first fall below a predetermined threshold MAX (DFT [k]) is to be found.

This edge detection is carried as follows:

First, the maximum value across all DFT[K] values is determined, i.e. to find max(DFT[K]). Then, the position of the first k (bin number) that is larger than max(DFT[k]) *Edge_threshold_coeff is found. Starting the search from last k:
for k=$N_{dft}$−1 down to 0:

if $DFT_k$>max($DFT_k$)*Edge_threshold_coeff:

$k_{edge}$=k
break loop

A value of Edge_threshold_coeff that works well with 3GPP LTE system is Edge_threshold_coeff=0.2. This edge detection is carried out by a DFT edge detection block 58.

The value of k_edge is then converted to a Doppler spread estimate:

$$FD\_est=K_{edge}*FD\_COEFF$$

where FD_est is in Hz, and FD_COEFF, the coefficient for converting DFT sample number to Hz depends on carrier frequency, and slot duration. The value is FD_COEFF=10.9 for 0.5 ms slots and carrier frequency of 2 GHz. The calculation of the Doppler spread is then carried out by the Doppler spread calculation block 60.

Conveniently, the Doppler spread can then be converted into an estimated speed of the mobile communication device in a speed computation block 62 by a simple calculation, as follows:

$$Speed\_est=c*3.6/FD\_est,$$

where Speed_est is in km/h, and c is speed of light in m/s.

The various functional blocks described hereabove can be implemented as Field Programmable Gate Arrays (FPGAs) of Application Specific Integrated Circuits (ASICs). However, other ways of implementing this functionality will be apparent to persons skilled in the relevant art.

While the present invention has been described in conjunction with a limited number of exemplary embodiments, it will be apparent to those skilled in the art that many alternatives, modifications and variations in light of the foregoing description are possible. Accordingly, the present invention is intended to embrace all such alternatives, modifications and variations as may fall within the spirit and scope of the invention as disclosed.

This application is based upon and claims the benefit of priority from Australian provisional patent application No. 2008905519, filed on Oct. 24, 2008 the disclosure of which is incorporated herein in its entirety by reference.

REFERENCE SIGNS LIST

Figure 1:
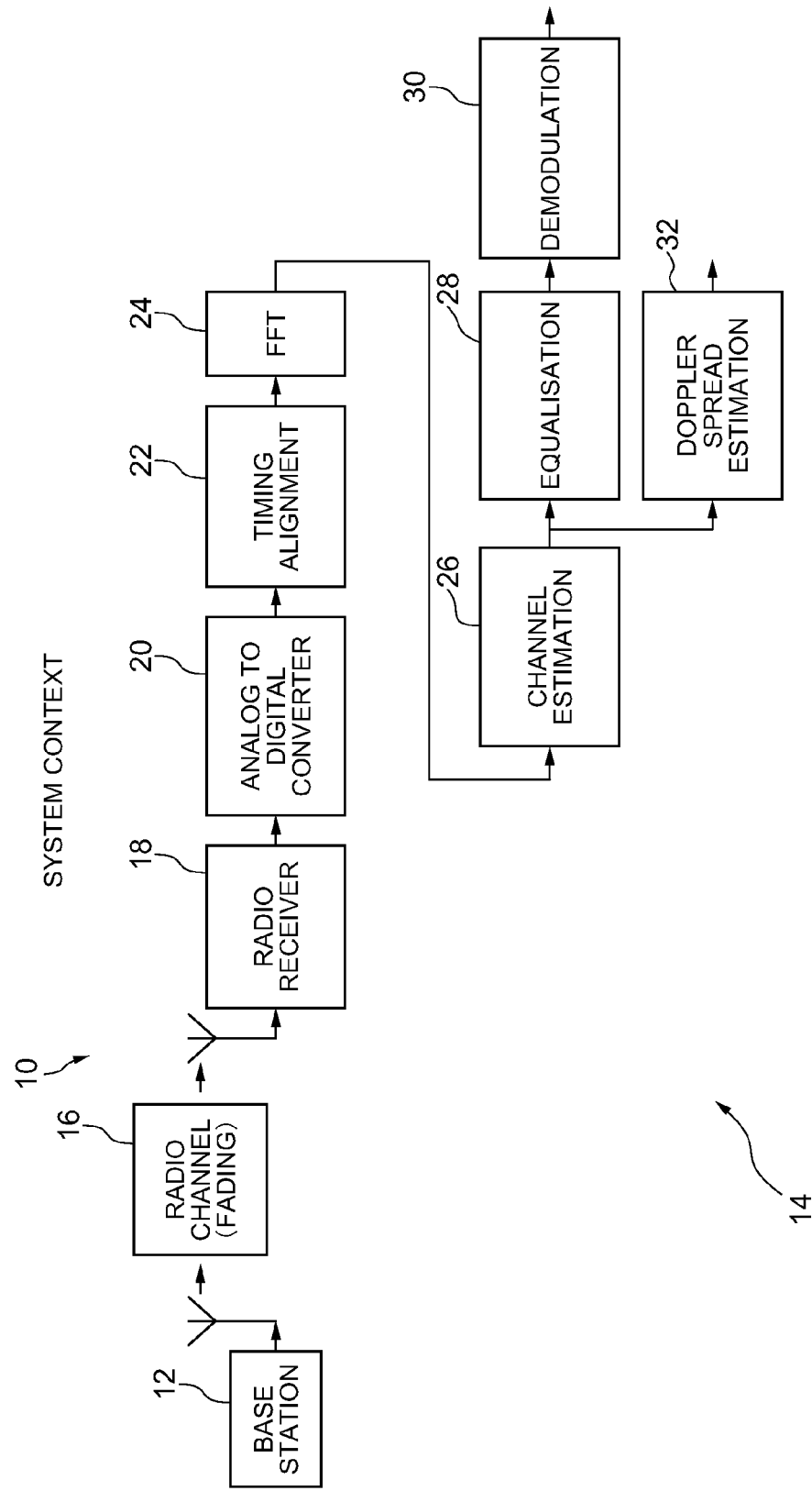
FIG. 1 is a schematic diagram of selected elements of a mobile communications system.
Figure 2:
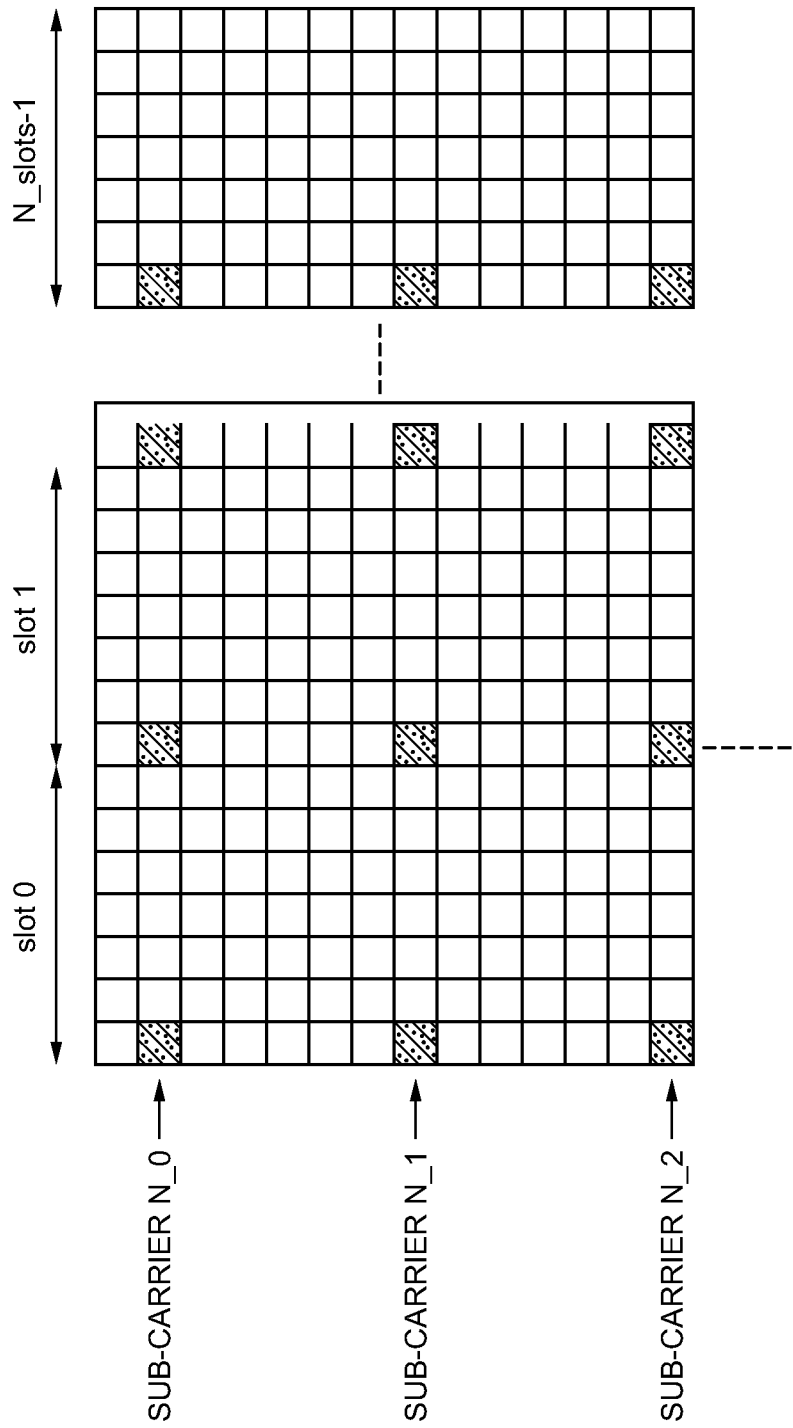
FIG. 2 is a depiction of the structure of channel estimates generated within a mobile communication device forming part of the system shown in FIG. 1.
Figure 3:
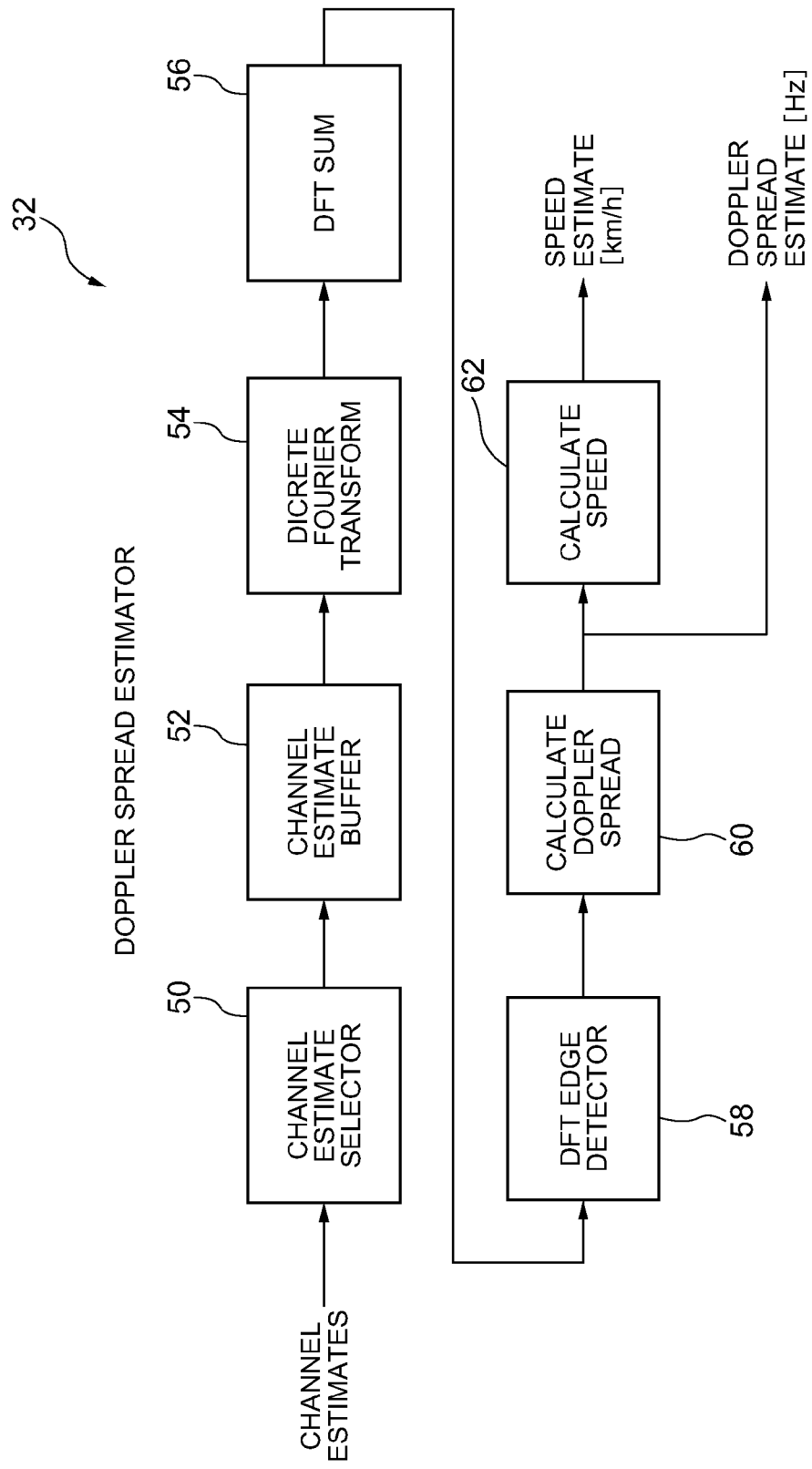
FIG. 3 is a flow chart depicting steps performed during the estimation of the Doppler spread in a mobile communication device forming part of the system shown in FIG. 1.
Figure 4:
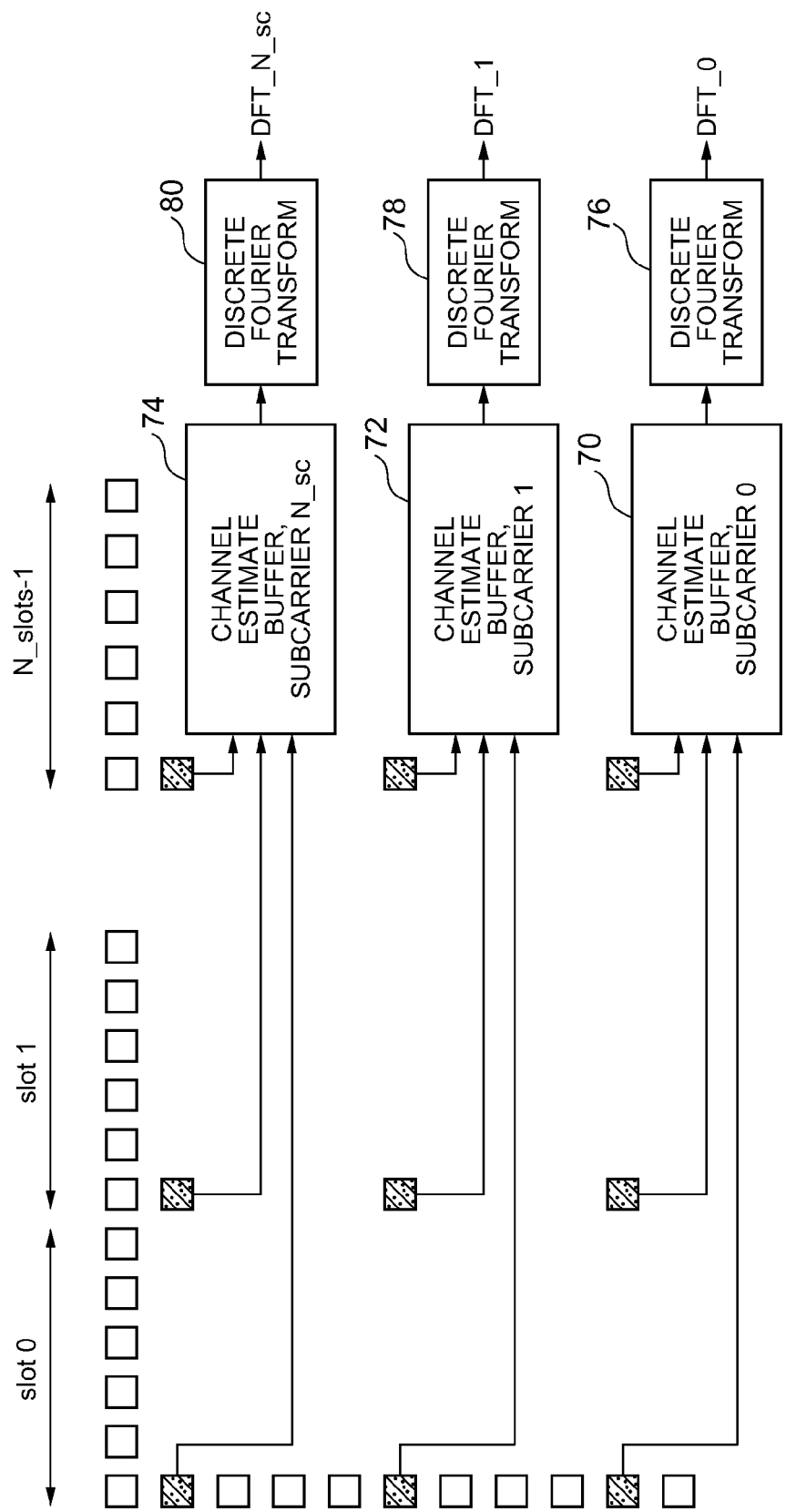
FIG. 4 is a diagram depicting steps performed in the Doppler spread estimation shown in FIG. 3.
Figure 5:
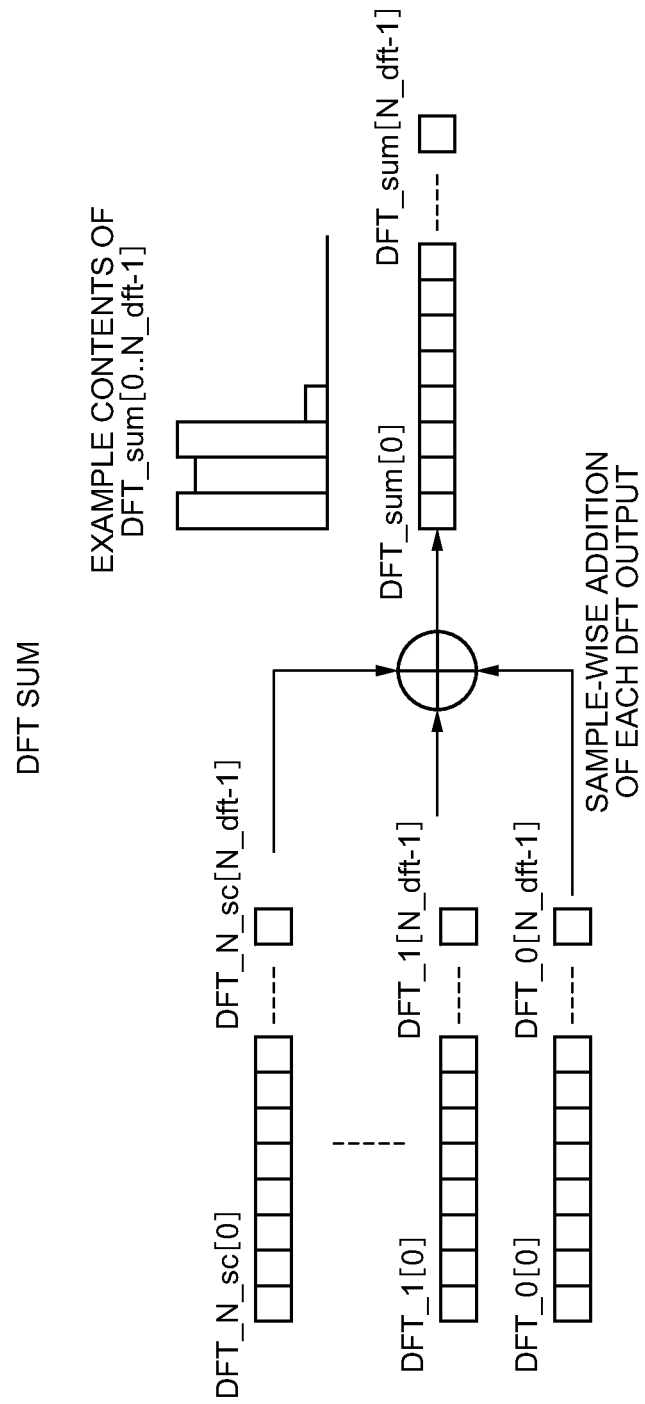
FIG. 5 is another diagram depicting another step carried out during the Doppler spread estimation shown in FIG. 3.
Figure 6:
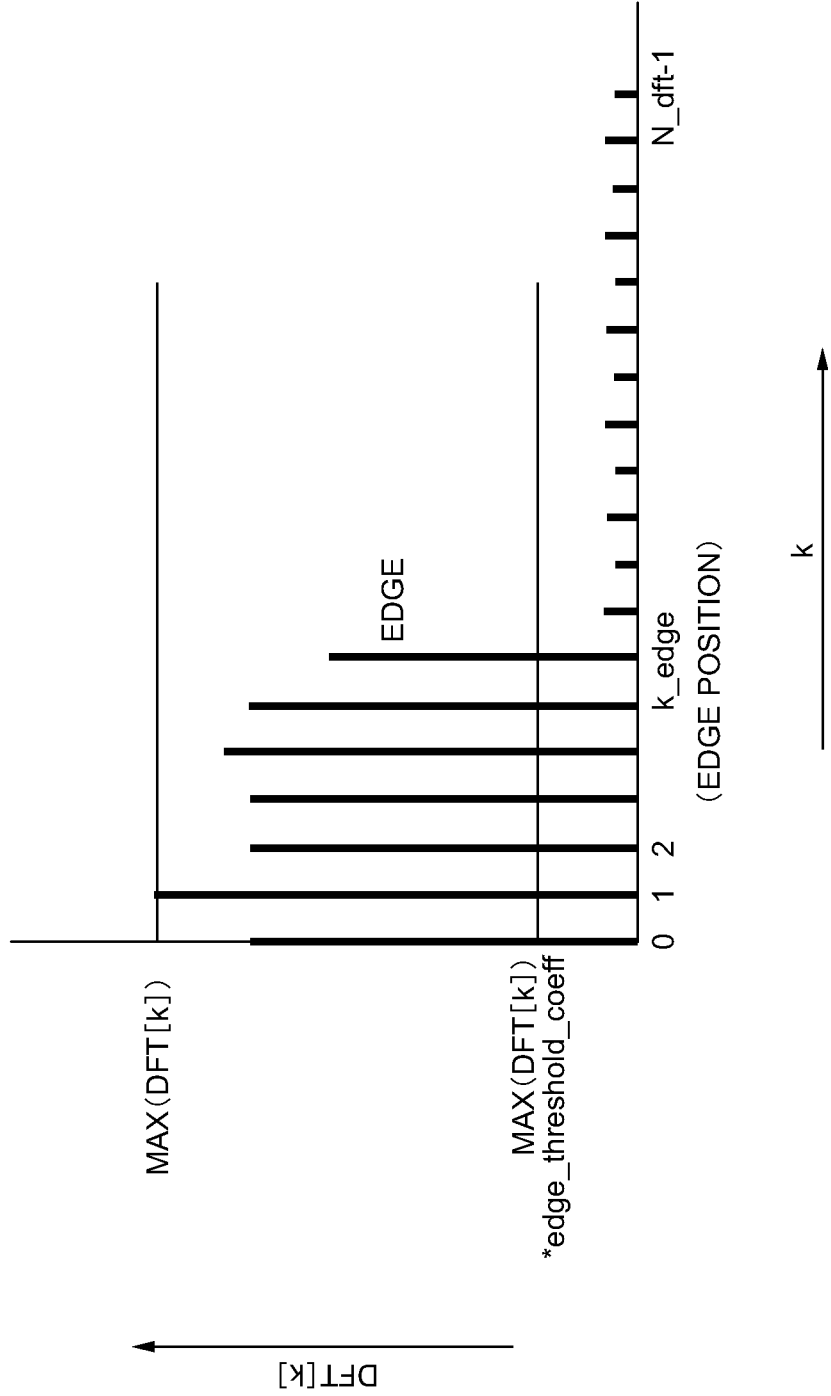
FIG. 6 is a graph depicting exemplary DFT components plotted against bin frequencies, and showing an edge used to detect Doppler spread.

18 Radio receiver block
20 Analog to digital converter
22 Timing alignment block
24 FFT block
26 Channel estimation block
28 Equalization block
30 Demodulation block

The invention claimed is:

1. A method of estimating Doppler spread in a mobile communications device, the method including:
   selecting a channel estimate from each of a sequence of time slots at each of a series of selected sub-carrier frequencies;
   calculating Digital Fourier Transform (DFT) components for each selected sub-carrier frequency separately, the DFT components being calculated by implementing a Goertzel algorithm to the selected channel estimates at each selected sub-carrier frequency;
   summing the DFT components at all selected sub-carrier frequencies for each different frequency bin;
   detecting a frequency bin at which a value of the summed DFT components first falls below a predetermined threshold; and
   converting the detected frequency bin into the Doppler spread estimate.

2. The method according to claim 1, wherein the channel estimates are calculated from received pilot symbols at a first symbol of each time slot.

3. The method according to claim 1, wherein the selected sub-carrier frequencies are evenly spaced across a transmission bandwidth.

4. The method according to claim 1, wherein the DFT components computed from the selected channel estimates at each selected sub-carrier frequency are stored separately in a buffer prior to being summed.

5. The method according to claim 1, wherein the calculating the DFT components for each selected sub-carrier frequency includes computing DFT components for only a first N_dft lowest frequency bins, where N_dft is a predetermined integer.

6. A method of estimating the speed of a mobile communications device, including:
   estimating a Doppler spread in the mobile communications device by carrying out the method according to claim 1; and
   converting the Doppler spread estimate into an estimated speed of the mobile communications device.

7. An estimator for estimating Doppler spread in a mobile communications device, the estimator including:
   a device for selecting a channel estimate from each of a sequence of time slots at each of a series of selected sub-carrier frequencies;
   a device for calculating Digital Fourier Transform (DFT) components for each selected sub-carrier frequency separately, the DFT components being calculated by implementing a Goertzel algorithm to the selected channel estimates at each selected sub-carrier frequency;
   a device for summing the DFT components at all selected sub-carrier frequencies for each different frequency bin;
   a device for detecting a frequency bin at which a value of the summed DFT components first falls below a predetermined threshold; and
   a device for converting the detected frequency bin into a Doppler spread estimate.

8. The estimator according to claim 7, further including a device for computing DFT components for only a first N_dft lowest frequency bins, where N_dft is a predetermined integer.

9. A mobile communications device including the estimator according to claim 7.

10. A mobile communications device including the estimator according to claim 8.

* * * * *

UNITED STATES PATENT AND TRADEMARK OFFICE
CERTIFICATE OF CORRECTION

PATENT NO. : 8,599,977 B2  Page 1 of 1
APPLICATION NO. : 13/124938
DATED : December 3, 2013
INVENTOR(S) : Filip Zalio It is certified that error appears in the above-identified patent and that said Letters Patent is hereby corrected as shown below:

In the Specification

Column 7, Line 10: Below "30 Demodulation block" insert -- 32 Doppler spread estimation block --.

Signed and Sealed this
Twelfth Day of August, 2014

Michelle K. Lee
*Deputy Director of the United States Patent and Trademark Office*